3,048,554
NON-CORROSIVE TEXTILE SIZING COMPOSITION COMPRISING AN ACRYLIC POLYMER AND AN AMINE SALT

Robert R. Dreisbach and John F. Mulloy, Midland, Mich., assignors to The Dow Chemical Company, Midland, Mich., a corporation of Delaware
No Drawing. Filed Sept. 13, 1956, Ser. No. 609,546
4 Claims. (Cl. 260—29.6)

This invention relates to new and improved textile sizing compositions. More particularly it relates to such sizing compositions finding use with both natural and synthetic textiles and which are non-corrosive.

Textile sizes have been employed for many years in the textile trade for assuring more productive and efficient weaving and processing operations. The requirements of a useful sizing material have been a film-forming ability from a solution in a solvent which is insert to the textile material, a high abrasion resistance, a capability of strong adhesion to the textile material, and a low cost. Many materials were available for use as sizing materials for the relatively rough-surfaced, hydrophilic, natural fibers. However, with the advent of the smooth-surfaced, hydrophobic, synthetic fibers it was found that those same materials were not operable because the films would not adhere to the fiber. Accordingly it was found necessary to resort to strongly acidic materials, such as polyacrylic acid to size synthetic materials, such as nylon. Such acidic materials are relatively expensive and highly corrosive to metals. Additionally, such materials tenderize the natural fibers, such as cotton, so that it was impossible to use them to size blends of natural and synthetic fibers. It would be highly desirable to have a sizing material which would be non-corrosive and which could be used with blends of natural and synthetic fibers.

It is accordingly an object of this invention to provide such a sizing composition.

The above and related objects are achieved with a sizing composition consisting essentially of (1) a water soluble acrylic acid polymer neutralized to a pH in one of the ranges of from 5 to 6.5 or from 7.5 to 9 with (2) an amine salt of (a) a water soluble alkylene polyamine wherein the alkylene group is selected from ethylene and propylene and (b) a stoichiometric amount based on the amine groups of an acid selected from the group consisting of ortho-boric, ortho-phosphoric and mixtures thereof. The invention likewise includes aqueous solutions of the sizing materials.

The basic film forming ingredient in this composition is a water soluble acrylic acid polymer and may be either polyacrylic acid itself, polymethacrylic acid or certain ternary polymers thereof. Those homopolymers are easily prepared by the catalytic and thermal polymerization of acrylic acid or methacrylic acid. Ternary polymers which have been found useful in this composition are those disclosed in our copending application, U.S. Serial No. 393,594, filed November 23, 1953, now U.S. 2,778,812. In that application are disclosed ternary polymers prepared from a monomeric material consisting of from 60 to 79 percent acrylic acid or methacrylic acid, from 20 to 39 percent of a vinyl alkyl ether wherein the alkyl group contains from 1 to 4 carbon atoms, and from 1 to 8 percent sulfur dioxide. The ternary polymers are prepared in aqueous solution with a water soluble catalyst and at temperatures of from 30 to 50° C. until polymerization is complete.

The water soluble alkylene polyamines are those in which the alkylene group is ethylene or propylene. When the alkylene group contains more than 3 carbon atoms, the water solubility of the sizing material is reduced to the point where other solvents must be employed. Water, being inexpensive, non-flammable, non-toxic, and inert to all of the common fiber materials, is to be greatly desired as the solvent for the sizing solution. As preferred alkylene polyamines may be mentioned ethylene diamine, diethylene triamine, triethylene tetramine, propylene diamine, dipropylene triamine, and tripropylene tetramine.

The amine salt is prepared from the amine and either ortho-boric acid, ortho-phosphoric acid, or mixtures of both of those acids. In preparing the salt, the acid and amine should be employed in about stoichiometric amounts of acid to the amine groups. When less than that amount of acid is used, no additional benefit results, and when more than that amount of acid is used in forming the salt, the resulting salt is acidic and corrosive in itself. Although either the boric or phosphoric acids may be used individually in forming the salt, it has been found that a mixture of acids in an amount of one mole of boric acid to 2 moles of phosphoric acid provides optimum results in the sizing composition, and that mixture is accordingly preferred.

Although the order of addition of the ingredients is not critical, it is most convenient and accordingly preferred to prepare the amine salt in water solution first and then to stir in the acrylic acid polymer. The solution may be warmed for a short time to insure complete reaction.

In preparing the solution, enough of the amine salt is used to neutralize the acrylic acid polymer to a pH of from 5 to 6.5 or from 7.5 to 9. The corrosive and tenderizing tendencies are not appreciably reduced in the pH range below 5. In the pH range of from 6.5 to 7.5 the sizing composition is not useful. Above a pH of 9 the adhesiveness to the synthetic fibers is reduced to inoperability and the tenderizing or mercerizing effect on the natural fibers is increased. A sizing material should not affect the properties of the base fiber. When a dry powder is desired for purposes of more economical shipping and storing, it is only necessary to evaporate the water from the solution. The dry powder thus obtained is readily soluble in water when the time for sizing arrives. It has been found that some of the solutions tend to gel after standing for a few weeks, and it is therefore desirable that the freshly prepared solution be dried if it is known that there will be prolonged storage before use.

The sizing composition may be used in aqueous solution in a concentration of about 10 to 25 percent by weight of the total solution. When less than a 10 percent solution is used, insufficient coating is applied to the textile material in a single pass and multiple passes are required. When more than a 25 percent solution is prepared, the solution frequently becomes so viscous as to be difficult to handle.

The sizing composition of this invention may be used in aqueous solution with both natural and synthetic fibers and blends thereof. In aqueous solution it shows little corrosive tendencies toward any metallic elements with which it may come in contact and also has no noticeable tenderizing effect on the natural fibers.

The composition is easily applied to the fibers by merely dipping the fibers into a bath of an aqueous solution of the composition, removing the excess by passing the fibers through padding rolls or their equivalent, and drying either a room temperature or under forced warm air. If desired, multiple coats may be applied, although such coats are more expensive than a single coat.

In an illustrative example, an aqueous solution of a sizing composition was prepared by dissolving in water 15 parts by weight of diethylene triamine, 4.4 parts by weight of boric acid, and 4.7 parts by weight of phosphoric acid, to give a 25 percent by weight solution. A copolymer composed of 76.12 percent acrylic acid, 17 percent vinyl methyl ether, and 6.88 percent sulfur dioxide was stirred into the aqueous amine salt solution until a pH of 5 was reached. The solution was then diluted to 10 percent concentration.

Saran fibers of a composition of 85 percent by weight of vinylidene chloride and 15 percent by weight of vinyl chloride were dipped into the aqueous sizing solution, squeezed to remove the excess, and air dried overnight. The sized material showed good heat and light stability and good stiffness and the sizing was a continuous coherent film when examined by a photomicrograph.

The same solution was used in the same way to size cotton, nylon, and polyacrylonitrile fibers with the same good results.

Similar results are obtained when the amine salt is made with only boric acid or phosphoric acid and with dipropylene triamine. In addition, good sizing qualities are obtained with a polyacrylic acid neutralized in accordance with this invention.

We claim:

1. A composition of matter consisting essentially of 10 to 25 percent by weight aqueous solution of (1) a water soluble polymer composed predominantly of a polymerized form of an acid from the group consisting of acrylic and methacrylic acids, neutralized to a pH which is from 0.5 to 2.0 pH units away from the neutral point; with (2) a water soluble amine salt of (a) a water soluble polyalkylene polyamine wherein the alkylene group is selected from ethylene and propylene, and (b) a stoichiometric amount based on the amine groups of said polyalkylene polyamine of an acid selected from the group consisting of boric acid, phosphoric acid, and mixtures thereof.

2. The composition claimed in claim 1, wherein said acrylic acid polymer is a ternary polymer or from 60 to 79 percent by weight of an acid selected from acrylic and methacrylic acids, from 20 to 39 percent by weight of a vinyl alkyl ether wherein the alkyl group contains from 1 to 4 carbon atoms and from 1 to 8 percent by weight of sulfur dioxide.

3. The composition claimed in claim 1, wherein said acrylic acid polymer is polyacrylic acid.

4. The composition claimed in claim 1, wherein the acid forming said acid salt is a mixture in the ratio of one mole of boric acid to two moles of phosphoric acid.

References Cited in the file of this patent

UNITED STATES PATENTS

| | | |
|---|---|---|
| 2,200,184 | Morgan | May 7, 1940 |
| 2,289,540 | Dittmar et al. | July 14, 1942 |
| 2,702,796 | Fine | Feb. 22, 1955 |

FOREIGN PATENTS

| | | |
|---|---|---|
| 894,314 | France | Mar. 13, 1944 |